US008832957B2

(12) United States Patent
Meister (10) Patent No.: US 8,832,957 B2
(45) Date of Patent: Sep. 16, 2014

(54) APPARATUS AND METHOD FOR DETERMINING ASH HEIGHT IN A FILTER (75) Inventor: Steven Francis Meister, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 235 days.

(21) Appl. No.: 13/558,471

(22) Filed: Jul. 26, 2012

(65) Prior Publication Data
US 2014/0026432 A1 Jan. 30, 2014

(51) Int. Cl.
*G01B 5/02* (2006.01)
(52) U.S. Cl.
USPC .............................................. 33/719; 33/836
(58) Field of Classification Search
USPC ............ 33/600, 700, 701, 713, 719, 727, 836
See application file for complete search history.

(56) References Cited

U.S. PATENT DOCUMENTS

| | | | | |
|---|---|---|---|---|
| 2,919,028 | A * | 12/1959 | Janus | 33/718 |
| 3,363,320 | A * | 1/1968 | Helms | 33/836 |
| 4,530,158 | A * | 7/1985 | Chauquet | 33/836 |
| 4,635,478 | A | 1/1987 | Hope | |
| 5,191,719 | A * | 3/1993 | Kitt | 33/719 |
| 5,211,011 | A | 5/1993 | Nishikawa et al. | |
| 5,315,823 | A | 5/1994 | Nishikawa et al. | |
| 5,351,414 | A * | 10/1994 | Cogliano | 33/719 |
| 5,446,774 | A * | 8/1995 | Russell et al. | 33/543 |
| 5,584,176 | A | 12/1996 | Meyer et al. | |
| 5,845,492 | A | 12/1998 | Isobe et al. | |
| 5,974,792 | A | 11/1999 | Isobe | |
| RE36,737 | E | 6/2000 | Brehob et al. | |
| 6,804,952 | B2 | 10/2004 | Sasaki et al. | |
| 6,834,496 | B2 | 12/2004 | Nakatani et al. | |
| 6,868,827 | B2 | 3/2005 | Surnilla et al. | |
| 7,007,460 | B2 | 3/2006 | Frieden et al. | |
| 7,086,221 | B2 | 8/2006 | Pott et al. | |
| 7,157,919 | B1 | 1/2007 | Walton | |
| 7,168,239 | B2 | 1/2007 | Ingram et al. | |
| 7,261,086 | B2 | 8/2007 | Nuang | |
| 7,654,079 | B2 | 2/2010 | Ruth et al. | |
| 7,797,926 | B2 | 9/2010 | Nishino et al. | |
| 7,895,762 | B2 * | 3/2011 | Kim et al. | 33/836 |
| 8,024,919 | B2 | 9/2011 | Fluga et al. | |
| 8,091,414 | B2 | 1/2012 | Harshbarger et al. | |
| 8,365,428 | B2 * | 2/2013 | Miller et al. | 33/836 |
| 8,572,860 | B2 * | 11/2013 | Fritzinger | 33/836 |
| 2006/0144223 | A1 | 7/2006 | Sellers et al. | |
| 2007/0283682 | A1 | 12/2007 | Cullen et al. | |
| 2008/0087007 | A1 | 4/2008 | Konstandopoulos | |

(Continued)

FOREIGN PATENT DOCUMENTS

| | | |
|---|---|---|
| EP | 0935056 A2 | 8/1999 |
| EP | 1387051 A1 | 2/2004 |
| WO | 2012088426 | 6/2012 |

*Primary Examiner* — G. Bradley Bennett
(74) *Attorney, Agent, or Firm* — Miller, Matthias & Hull (57) ABSTRACT

A system for determining ash height in a filter is disclosed. The system may comprise a string, and a pressure source configured to propel a portion of the string down a channel of a filter. A method for determining ash height in a filter is also disclosed. The method may comprise propelling a portion of a string down a channel of a filter, and determining an ash height in the filter channel based on a measurement of the string inside the filter channel and a known length of a clean filter channel having no ash accumulation.

20 Claims, 6 Drawing Sheets

(56) References Cited

U.S. PATENT DOCUMENTS

| | | |
|---|---|---|
| 2009/0000477 A1 | 1/2009 | Meister et al. |
| 2009/0133391 A1 | 5/2009 | Porten et al. |
| 2009/0308052 A1 | 12/2009 | Zhang et al. |
| 2010/0137874 A1* | 6/2010 | Kim et al. ............ 33/836 |
| 2010/0180772 A1 | 7/2010 | Beall et al. |
| 2011/0146721 A1 | 6/2011 | Meister et al. |
| 2012/0017570 A1 | 1/2012 | Kulkarni |
| 2012/0090187 A1* | 4/2012 | Peters ............ 33/701 |
| 2012/0151788 A1* | 6/2012 | Miller et al. ............ 33/701 |
| 2012/0234169 A1* | 9/2012 | Painter et al. ............ 95/278 |

* cited by examiner

APPARATUS AND METHOD FOR DETERMINING ASH HEIGHT IN A FILTER

FIELD OF THE DISCLOSURE

The present disclosure relates generally to maintenance and service of internal combustion engine components and, more particularly, to apparatuses and methods for measuring ash accumulated in diesel particulate filters.

BACKGROUND OF THE DISCLOSURE

Internal combustion engines exhaust a mixture of air pollutants, which may be composed of gaseous compounds, as well as solid particulate matter. One byproduct of fuel combustion in an internal combustion engine is carbon particles, which are typically referred to as soot. Due to regulated emission standards, engine manufacturers have employed various components and systems to control and limit the amount of soot emitted into the environment.

One such device that has been commonly used to collect soot, ash, and other particulate matter before entering the environment is a diesel particulate filter. However, extended use of diesel particulate filters may cause matter to build up in the filters and reduce their functionality, as well as engine performance. Soot may be burned off through a regeneration process, but the ash, which is generally a non-combustible by-product of lubricating oils, cannot be reduced and therefore accumulates in the diesel particulate filter. The ash must either be removed by cleaning the filter to remove the ash on a periodic basis to restore exhaust flow through the filter, or the diesel particulate filter must be replaced.

Cleaning tools may be used for removing ash from diesel particulate filters. However, engineers continue to search for a way to check the cleanliness of the diesel particulate filter and effectiveness of the cleaning process before re-installation of the diesel particulate filter into the engine. Conventionally, measurements of backpressure through the filter, before and after cleaning, have been used to derive the cleanliness of the filter, but have not consistently yielded accurate results. This is because the change in flow resistance due to ash accumulation is so small that it is difficult to measure a change in pressure unless the air flow generated to develop the pressure is extremely high, which would require large and expensive blower hardware. Alternatively, boroscope equipment may be used to determine the ash column height in a channel of a diesel particulate filter by directly viewing the ash height in individual filter columns; however, use of this type of equipment is expensive and time consuming.

Thus, there exists a need for an improved, reliable, and cost-effective apparatus and method for determining ash height in a filter.

SUMMARY OF THE DISCLOSURE

An exemplary embodiment of the present invention is directed to a system for determining ash height in a filter. The system may comprise a string, and a pressure source configured to propel a portion of the string down a channel of a filter.

According to another exemplary embodiment of the present invention, a method for determining the ash height in a filter is disclosed. The method may comprise propelling a portion of a string down a channel of a filter, and determining an ash height in the filter channel based on a measurement of the string inside the filter channel and a known length of a clean filter channel having no ash accumulation.

According to yet another exemplary embodiment of the present invention, an apparatus for measuring ash height in a diesel particulate filter is disclosed. The apparatus may comprise a string having a bulb element at one end and a marker element at a location distal from the bulb element, a transparent tubular member enclosing the string, a scale near the tubular member, the marker element and scale configured to provide a measurement reading of an ash height inside a channel of the diesel particulate filter, a pressure source operatively connected to the tubular member such that pressure can be applied to the string in order to propel a portion of the string and bulb element down a channel of a diesel particulate filter, and a trigger element configured to control the pressure coming into the tubular member from the pressure source.

These and other aspects and features of the invention will become more readily apparent upon reading the following detailed description when taken in conjunction with the accompanying drawings.

Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof will be shown and described below in detail. The invention is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
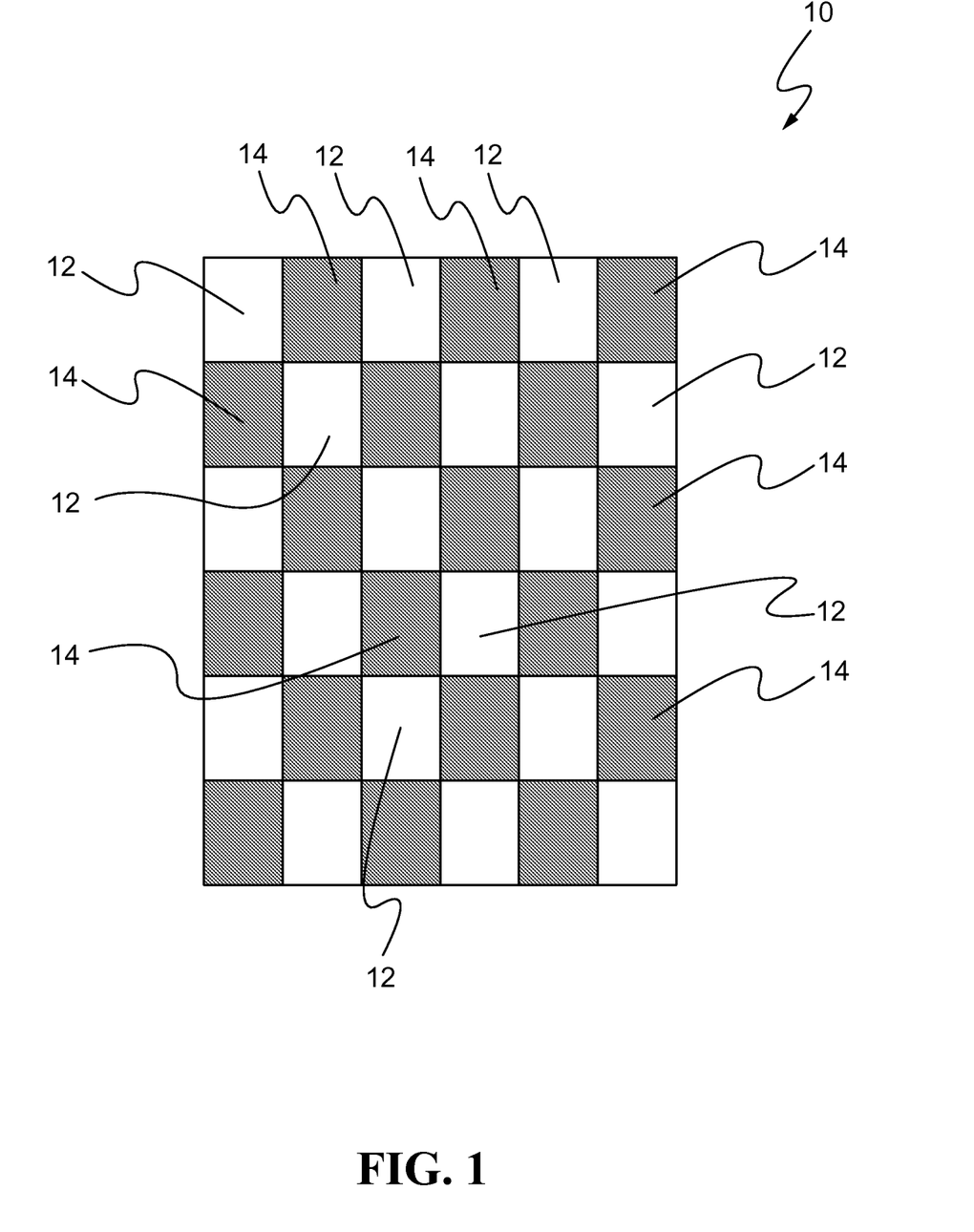
FIG. 1 is a schematic top view of a representative filter, which may employ the teachings of the present invention.

Turning now to FIG. 1, a top view of a diesel particulate filter 10 is shown. Although the filter 10 is a diesel particulate filter, it will be understood that other types of filters may certainly employ the teachings of this disclosure without departing from the spirit and scope of the invention. The filter 10 may have a plurality of channels 12, with every other channel 14 of the filter 10 being blocked such that no air may pass through the blocked channels 14. During engine operation, ash may accumulate inside the open channels 12 of the filter 10. Before or after cleaning the ash accumulation within the channels 12 of the filter 10, maintenance personnel may desire to check the amount of ash that has accumulated within the filter channels 12, check the cleanliness of the filter channels 12, or monitor the effectiveness of the cleaning process.

Figure 2:
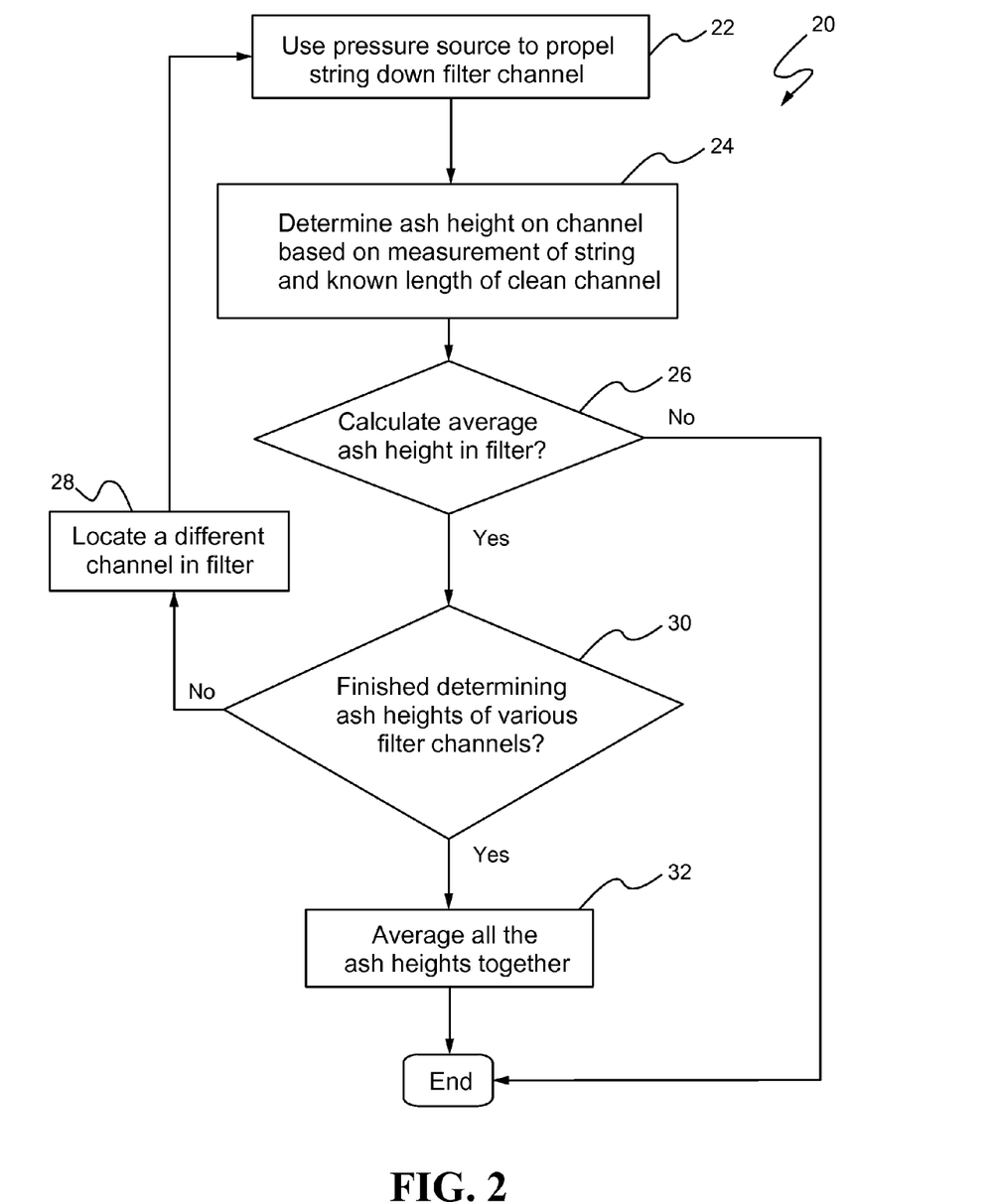
FIG. 2 is a flowchart outlining a method for determining ash height in a filter according to an exemplary embodiment of the present disclosure.

Referring now to FIG. 2, a flowchart outlining a method 20 for determining the ash height in the filter 10 is shown, according to an exemplary embodiment of the present disclosure. At first step 22, in order to determine the ash height in a single channel 12 of the filter 10, a pressure source is used to propel a string down the channel 12. Next at step 24, the ash height in the channel 12 is determined based on a measurement of the length of string inside the channel 12 and based on a known or predetermined length of a clean channel having no ash accumulation. The length of a clean channel having no ash accumulation may be determined by measuring the length of a channel 12 of the filter 10 before its initial use.

At step 26, in order to calculate an average ash height in the filter 10, steps 22 and 24 are repeated for a plurality of channels 12 in the filter 10. Thus, at step 28, a different channel 12 in the filter 10 is located and the ash height of that channel is determined by using the pressure source to propel the string down the channel and determining the ash height based on the string measurement and the known length of a clean channel. At step 30, once the ash heights of various channels 12 of the filter 10 are determined, then at step 32, all the ash heights of the various channels are averaged together to obtain an average ash height in the filter 10.

Figure 3:
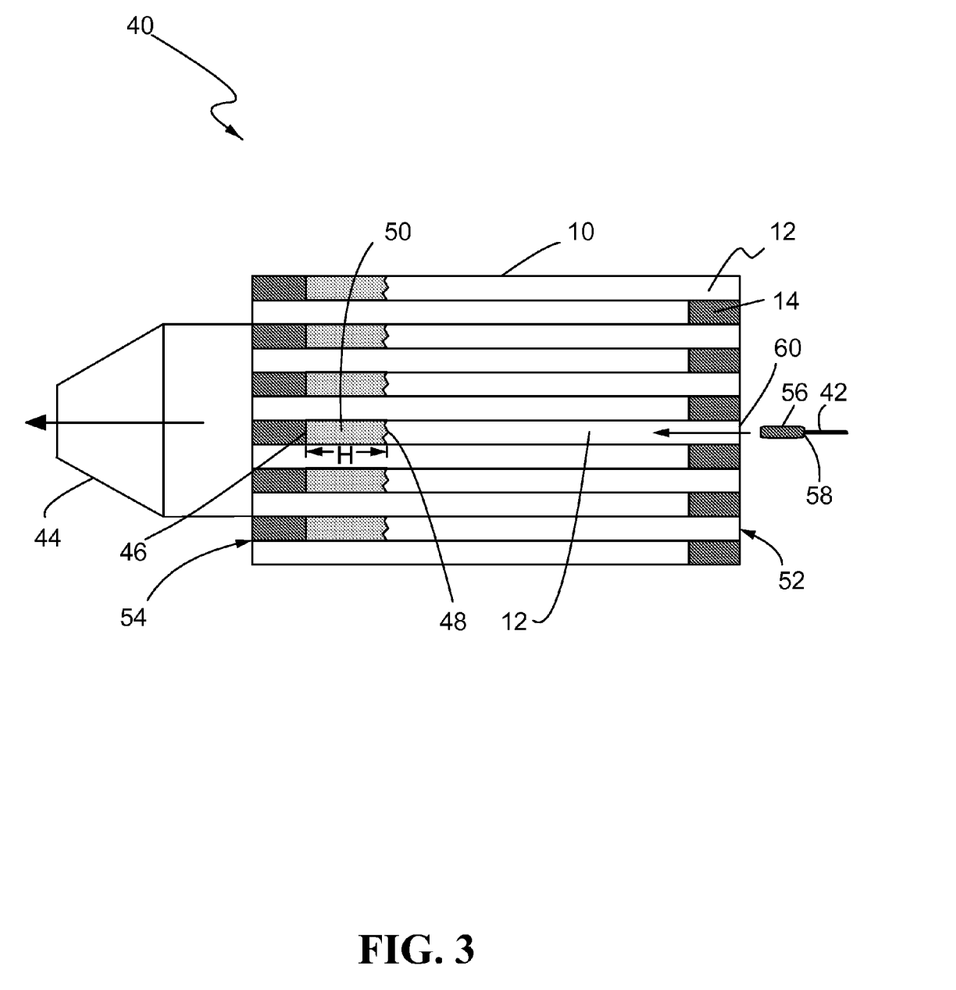
FIG. 3 is a side view of a filter and a system for determining ash height in a filter according to another exemplary embodiment of the present disclosure.

Turning now to FIG. 3, a system 40 for determining an ash height H, or height of ash accumulation, in the filter 10 is shown, according to another exemplary embodiment of the present disclosure. The system 40 may comprise a string 42 and a pressure source 44. As used herein, a "string" is understood to be a filament of substantially cylindrical shape. It may be a monofilament or be comprised of multiple spiral or otherwise wound strands. The pressure source 44 may be configured to propel a portion of the string 42 down the channel 12 of the filter 10 until the string 42 reaches an end 46 of the channel 12 or a top surface 48 of the ash 50 accumulated in the channel 12. The filter 10 may have an inlet side 52 and an outlet side 54. While the string may be positioned at the inlet side 52 of the filter 10, the pressure source 44 may be positioned at the outlet side 54 of the filter 10. The pressure source 44 may comprise a suction device configured to provide negative pressure at the outlet side 54 of the filter 10 to draw the string 42 from the inlet side 52 of the filter 10 and into the channel 12 of the filter 10. For example, the suction device may comprise, but not be limited to, a vacuum.

The string 42 may have a bulb element 56 at an end 58 of the string 42 entering the filter channel 12. The bulb element 56 may have a cross-sectional area that is larger than the cross-sectional area of the string. In so doing, the bulb element 56 provides for a differential surface area for the pressure source 44 to propel the string 42 and bulb element 56 down the length of the channel 12 to the ash 50 accumulation inside the channel 12 (or the end 46 of the channel 12 if there is no ash 50 accumulation). For example, the bulb element 56 may comprise, but not be limited to, a bulb, a knot, a nylon bead, or any element having a larger cross-section than the cross-section of the string. The string 42 may be composed of, but not limited to, nylon or steel wire.

Figure 4:
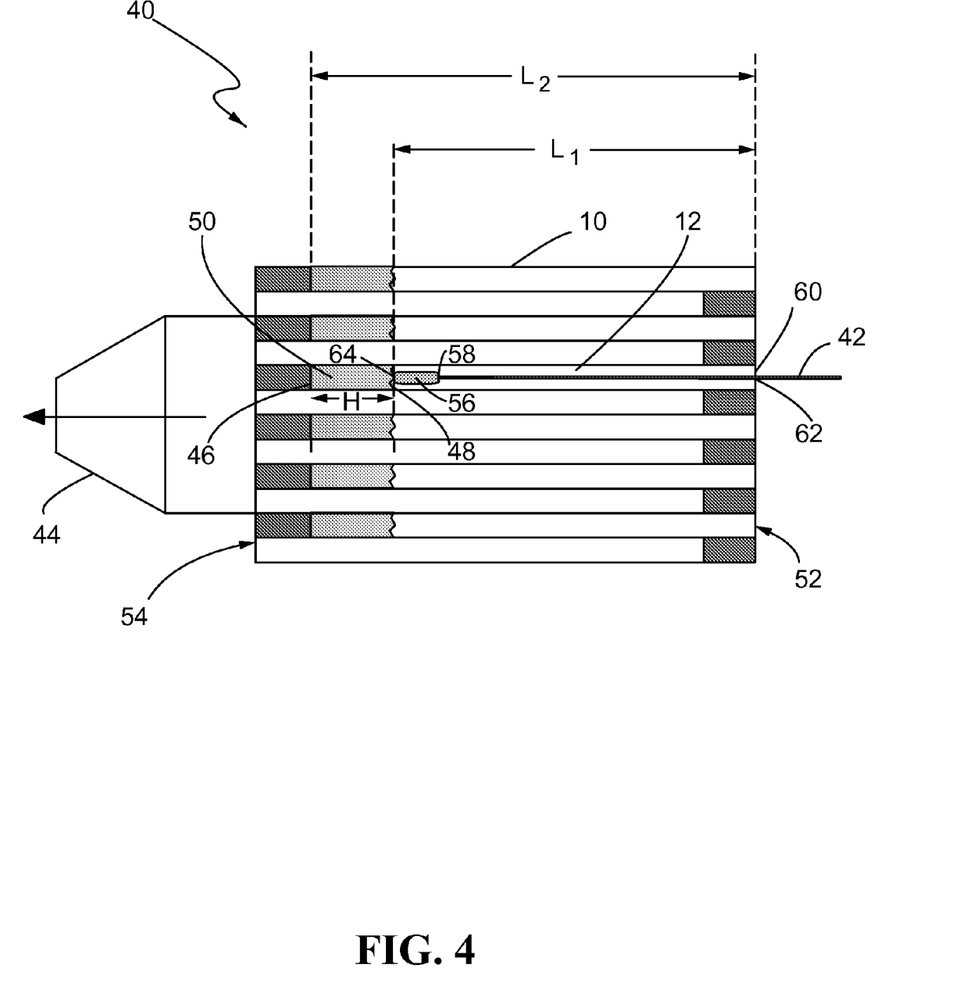
FIG. 4 is a side view of the filter and system in FIG. 3 showing a string down a channel of the filter.

As shown in FIG. 4, once the pressure source 44 pulls the string 42 and bulb element 56 through the inlet 60 of the channel 12 and down the channel 12 to the top surface 48 of the ash 50 accumulation, the string 42 may be marked at a location on the string 62, such as the location 62 on the string 42 which aligns with the inlet 60 of the filter channel 12. A length $L_1$ of the string 42, from a tip 64 of the bulb element 56 to the point 62 on the string 42, may signify the length of the portion of the string 42 that was inside the channel 12, which would be equivalent to the length of the channel 12 from the top surface 48 of the ash 50 accumulation to the inlet 60 of the channel 12. The string 42 may be pulled out of the filter channel 12, and the length $L_1$ of the string 42 portion may be manually measured from the tip 64 of the bulb element to the point 62. In another embodiment, the length $L_1$ may be measured automatically such that electronic readings of the length $L_1$ may be generated. For example, a sensor may be configured to determine the length $L_1$ of string propelled from a string source, such as, a spool.

As described above with respect to step 24 in FIG. 2, the ash height H in the channel 12 may be determined based on a measurement of the string inside the channel 12 and based on a known or predetermined length $L_2$ (in FIG. 4) of a clean channel having no ash accumulation. The length $L_2$ of a clean channel, which is the length of the channel 12 from the end 46 to the inlet 60, may be equal to the length $L_1$ of the string 42 from the inlet 60 to the top surface 48 of the ash plus the height H of the ash inside the channel 12, as shown in FIG. 4. Thus, the following equation results:

$$L_2 = L_1 + H$$

After manipulating the above equation to solve for the ash height H, the following equation results:

$$H = L_2 - L_1$$

Therefore, the measurement for the length $L_1$ of the string 42 portion that was inside the channel 12 may be subtracted from the known length $L_2$ of a clean channel, yielding the measurement of ash height H.

Figure 5:
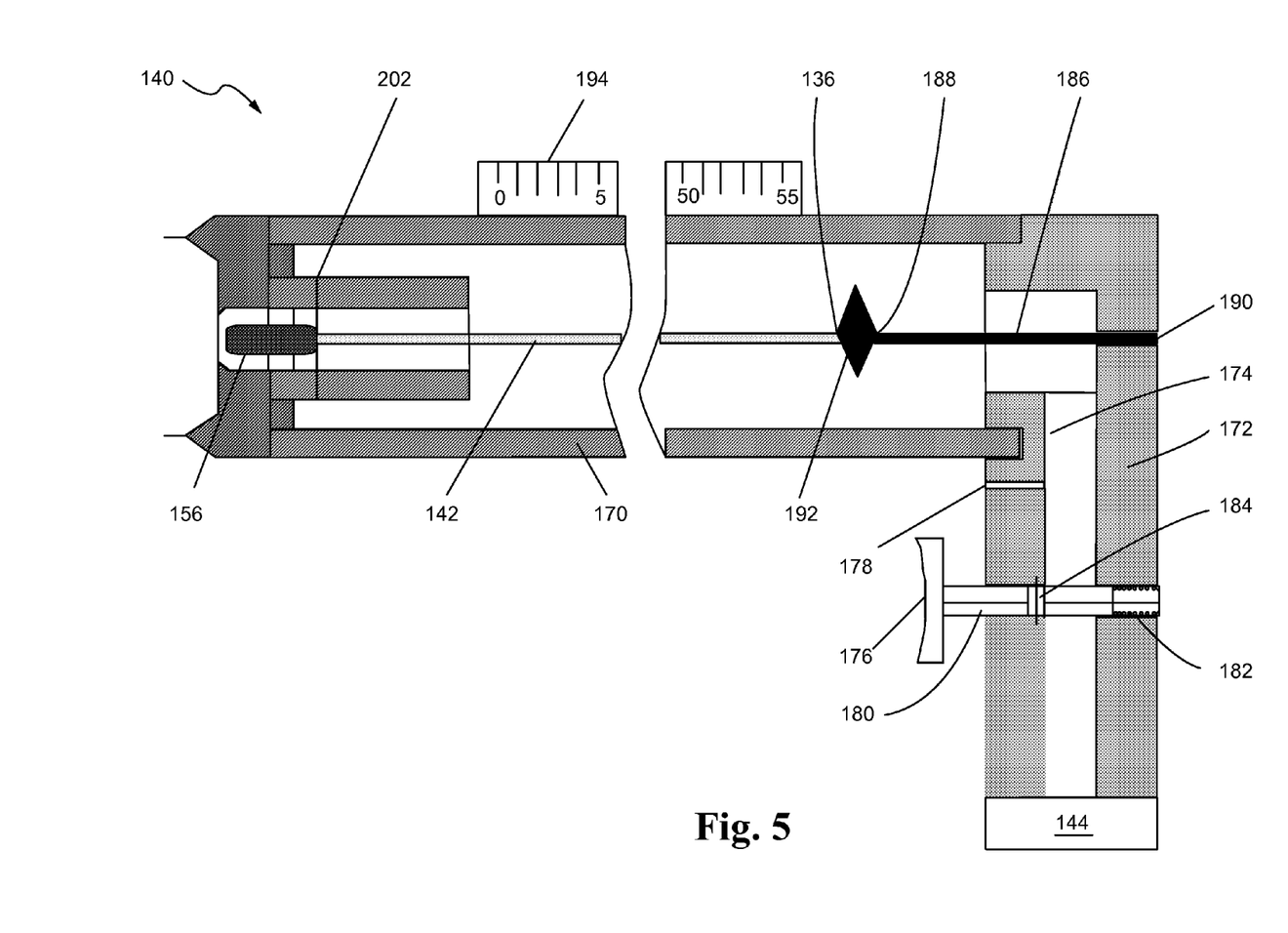
FIG. 5 is a side view of an apparatus for determining ash height in a filter according to yet another exemplary embodiment of the present disclosure.
Figure 6:
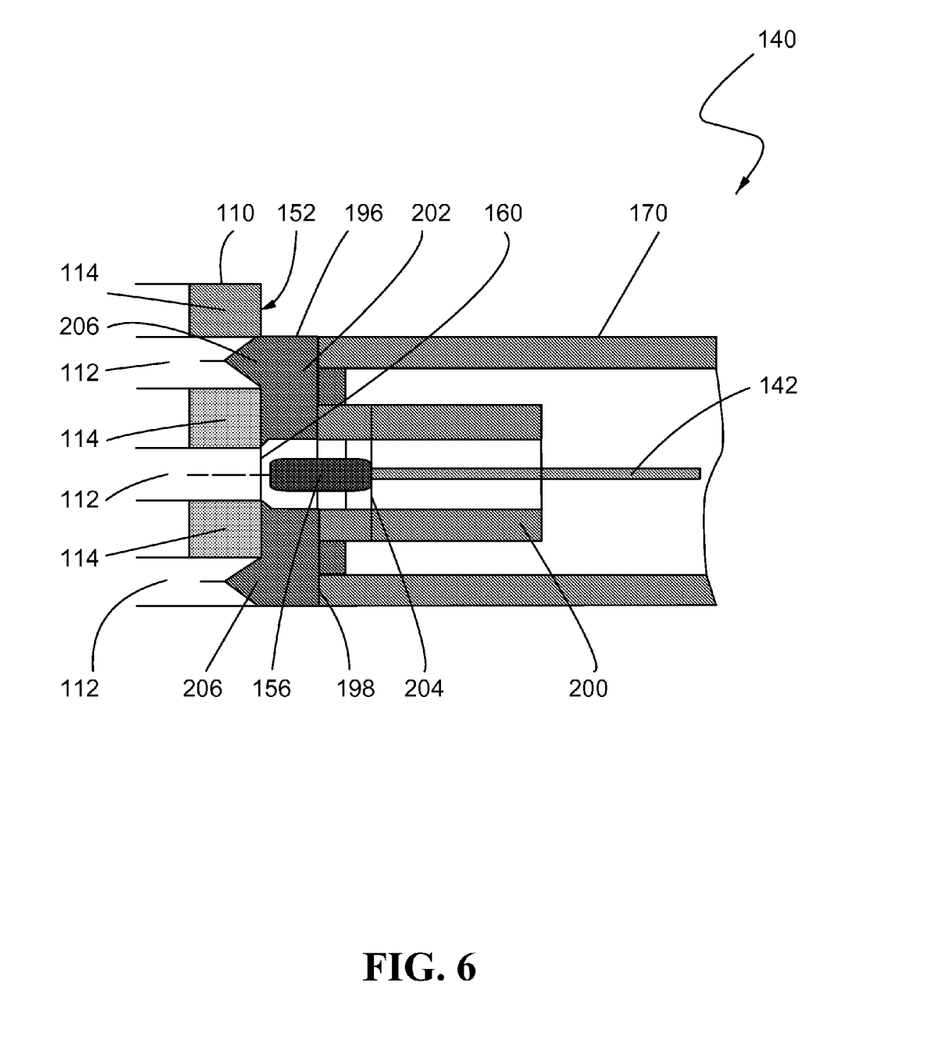
FIG. 6 is side view of a portion of the apparatus in FIG. 5 indexed to a face of a filter channel according to an exemplary embodiment of the present disclosure.

Turning now to FIGS. 5 and 6, another system or apparatus 140 for determining ash height in a filter 110 is shown, according to yet another exemplary embodiment of the present disclosure. Similar to the previous embodiment, the apparatus 140 may comprise a string 142 having a bulb element 156 and a pressure source 144 configured to propel a portion of the string 142 down a channel 112 of the filter 110 until the string 142 reaches an end of the channel or a top of the ash accumulated in the channel. In this embodiment, the pressure source 144 may comprise an gas supply configured to provide positive pressure to push the string 142 into the channel 112 of the filter 110. For example, the gas supply may comprise, but not be limited to, an air compressor.

The apparatus 140 may further comprise a transparent tubular member 170 enclosing the string 142. For example, the transparent tubular member 170 may comprise, but not be limited to, a glass or plastic tube. The tubular member 170 may be operatively connected to the pressure source 144, or gas supply, and may be configured to direct pressurized gas from the gas supply into the channel 112 of the filter 110 in order to propel the string 142 down the channel 112. Although described herein as being operatively connected to a positive pressure source, it will be understood that the tubular member 170 may also be used with a negative pressure source. For example, in another embodiment, the tubular member 170 may be operatively connected to a vacuum.

The apparatus 140 may also comprise a handle 172 connecting the pressure source 144 to the tubular member 170. The handle 172 may be configured to provide easy manipulation of the apparatus 140 and may include a passage 174 for gas flow from the pressure source 144 into the tubular member 170. The handle 172 may further include a trigger element 176 and a bleed orifice or opening 178. The trigger element 176 may be configured to control the gas flow coming into the tubular member 170 from the pressure source 144.

More specifically, the trigger element 176 may be configured to start and stop the flow of pressurized gas which propels the string 142 and bulb element 156 into the channel 112. For example, the trigger element 176 may comprise a sliding member 180 that is biased against a spring 182. The sliding member 180 may have a passage 184, such that when an operator pushes the sliding member 180 in toward the handle 172 compressing the spring 182, the passage 184 of the trigger element 176 aligns with the passage 174 of the handle 172, allowing gas to flow from the pressure source 144 through the passage 184 in the sliding member 180 and passage 174 in the handle 172 and into the tubular member 170.

An elastic member 186 may be operatively connected to the string 142 at one end 188 and may be attached to the inside of the handle 172 at the other end 190. Within the tubular member 170 and part of the handle 172, the elastic member 186 may be configured to provide force or tension to retract the bulb element 156 and string 142 into the tubular member 170. The opening 178 and elastic member 186 may provide for the retraction of the string 142 and bulb element 156 back into the tubular member 170. When the operator releases the trigger element 176, the spring 182 returns the sliding member 176 to its original position, causing the passage 174 of the handle 172 to be blocked. In this position, no pressurized gas can flow through from the pressure source 144 into the tubular member 170, and some of the existing pressurized gas is discharged through the opening 178. At the same time, the elastic member 186 may pull back the string 142 and bulb element 156 into the tubular member 170, having no opposition from the pressure source 144. In another embodiment, the string 142 may extend a length out of the back of the handle 172 such that the operator can manually retract the string 142 after a measurement has been taken.

A marker element 192 may be attached between the end 136 of the string 142 and the end 188 of the elastic member 186. Alternatively, the marker element 192 may be positioned at a location on the length of the string 142, such as at a location distal from the bulb element 156. A scale 194 may be located proximal to the outside of the tubular member 170. The marker element 192 and the scale 194 may provide for visual measurement readings of the ash height inside the filter channel 112. More specifically, the marker element 192 may align with the number "0" on the scale 194 when the string 142 is pushed into the filter channel 112 and there is no ash accumulation (or the filter channel 112 is clean). When there is ash accumulation within the channel 112, the marker element 192 may align with a numerical value on the scale 194, indicating a positive reading of the ash height. Although the marker element 192 is in the shape of a diamond in FIG. 5, it will be understood that the marker element 192 may comprise any shape or size that is visible through the transparent tubular element 170 and can be used in conjunction with the scale 194 to indicate the measurement of ash height in the filter channel 112.

As shown specifically in FIG. 6, the apparatus 140 may be applied at the inlet side 152 of the filter 110. The tubular member 170 may have an indexing face element 196 attached to an end 198 of the tubular member 170 that is facing an inlet 160 of the filter channel 112. The indexing face element 196 may be configured to align the string 142 and bulb element 156 over an inlet 160 of the channel 112. For example, the indexing face element 196 may include a transparent cylindrical sleeve 200 and a rubber member 202. The transparent sleeve 200 may have a smaller diameter than the tubular member 170 and may be placed inside the tubular member 170 to keep the string 142 and bulb element 156 in the center of the tubular member 170. The sleeve 200 may further include a retaining pin 204 configured to retain the bulb element 156 and string 142 in position for deployment. More specifically, the retaining pin 204 may prevent the retraction of the bulb element 156 and string 142 back into the tubular member 170 beyond a predetermined location in the tubular member 170, due to the pull of the elastic member 186 or the operator manually retracting the string 142. The rubber member 202 may cover the adjacent blocked channels 114 and may have two or more plugs 206 for insertion into the adjacent open channels 112. Inserting the plugs 206 of the indexing face element 196 into the adjacent open channels 112 provides stability and accurate alignment during application of the apparatus 140 to a filter channel 112.

INDUSTRIAL APPLICABILITY

In general, the foregoing disclosure finds utility in various industrial applications, such as in maintenance and service of internal combustion engine components. In particular, the disclosed apparatus and method may be applied to measuring the ash height in a filter, such as a diesel particulate filter. By applying this apparatus and method to a machine, an accurate measurement of the ash accumulation or buildup within a single filter channel, as well as an average ash height of the filter by measuring a plurality of filter channels, can be obtained. In so doing, engine maintenance operators can efficiently and accurately determine the level of cleanliness in a filter and the need to replace or clean same. Furthermore, compared to the expensive cost of boroscope equipment, the present invention provides many cost-saving advantages due to its inexpensive parts of assembly.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

While some features are described in conjunction with certain specific embodiments of the invention, these features are not limited to use with only the embodiment with which they are described, but instead may be used together with or separate from, other features disclosed in conjunction with alternate embodiments of the invention.

What is claimed is:

1. A system for determining ash height in a filter, comprising:
    a string; and
    a pressure source configured to propel a portion of the string down a channel of a filter.

2. The system of claim 1, wherein the string has a bulb element at an end of the portion of the string that enters the filter channel, the bulb element having a cross-sectional area larger than a cross-sectional area of the string.

3. The system of claim 1, further comprising a transparent tubular member enclosing the string.

4. The system of claim 1, wherein the pressure source comprises a suction device configured to provide negative pressure to draw the string into the channel of the filter.

5. The system of claim 4, wherein the suction device comprises a vacuum positioned at an outlet of the filter channel.

6. The system of claim 1, wherein the pressure source comprises a gas supply configured to provide positive pressure to push the string into the channel of the filter.

7. The system of claim 3, wherein the transparent tubular member is configured to direct pressurized gas from a gas supply into the channel of the filter to propel the string down the channel of the filter.

8. The system of claim 7, wherein the gas supply comprises an air compressor operatively connected to the transparent tubular member.

9. The system of claim 3, further comprising a marker element positioned on the string at a location distal from an end of the string that enters the filter channel, and a scale located proximal to the transparent tubular member, the marker element and the scale configured to provide measurement readings of an ash height inside the filter channel.

10. The system of claim 1, further comprising a sensor configured to determine a length of the portion of the string inside the channel of the filter.

11. The system of claim 9, further comprising a trigger element positioned between the pressure source and the tubular member, the trigger element configured to start and stop the flow of pressurized gas which propels the string into the filter channel.

12. The system of claim 10, further comprising an elastic member attached to the marker element at one end and anchored at another end.

13. The system of claim 11, wherein the transparent tubular member has an opening, and wherein the elastic member and the opening provide retraction of the string back into the transparent tubular member when the flow of pressurized gas is stopped.

14. The system of claim 12, wherein the transparent tubular member has an indexing face element configured to align the string and bulb element over an inlet of the filter channel.

15. The system of claim 13, further comprising a retaining pin within the transparent tubular member, the retaining pin configured to prevent the string from being retracted beyond a predetermined location in the tubular member.

16. The system of claim 2, wherein a material of the string is composed of nylon and the bulb element comprises a nylon bead.

17. A method for determining an ash height in a filter, comprising:
   propelling a portion of a string down a channel of a filter; and
   determining an ash height in the filter channel based on a measurement of the string inside the filter channel and a known length of a clean filter channel having no ash accumulation.

18. The method of claim 16, further comprising repeating the steps of propelling a portion of the string down a filter channel and determining an ash height in the filter channel for a plurality of channels in the filter.

19. The method of claim 17, further comprising calculating an average ash height of the filter by averaging together the ash heights of the plurality of filter channels.

20. An apparatus for measuring ash height in a diesel particulate filter, comprising:
   a string having a bulb element at one end and a marker element at a location distal from the bulb element;
   a transparent tubular member enclosing the string;
   a scale near the tubular member, the marker element and scale configured to provide a measurement reading of an ash height inside a channel of the diesel particulate filter;
   a pressure source operatively connected to the tubular member such that pressure can be applied to the string in order to propel a portion of the string and bulb element down the channel of the diesel particulate filter; and
   a trigger element configured to control the pressure coming into the tubular member from the pressure source.

* * * * *